(12) United States Patent
Fachat et al.

(10) Patent No.: US 6,901,408 B2
(45) Date of Patent: May 31, 2005

(54) METHOD OF STRUCTURING A CATALOG

(75) Inventors: Andre Louis Fachat, Schriesheim (DE); Jochen Klein, Dossenheim (DE)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/108,051

(22) Filed: Mar. 27, 2002

(65) Prior Publication Data

US 2003/0187855 A1 Oct. 2, 2003

(51) Int. Cl.[7] .............................................. G06F 17/30
(52) U.S. Cl. .......................... 707/102; 707/101; 707/6
(58) Field of Search ................................ 707/102, 101, 707/1–10, 501.1, 513; 713/179, 180

(56) References Cited

U.S. PATENT DOCUMENTS

2002/0059183 A1 * 5/2002 Chen ............................. 707/1

* cited by examiner

*Primary Examiner*—Charles Rones
*Assistant Examiner*—Neveen Abel-Jalil
(74) *Attorney, Agent, or Firm*—McGuireWood LLP; John R. Pivnichny (57) ABSTRACT

The present invention relates to a method and system for electronic management of data, which can be represented in a directed graph according to an entity relationship model. Any entity relationship model compliant data pool, and particular a (web) catalog is structured by grouping catalog pages (nodes) into groups (node types) with similar properties like attributes and relationships. Catalog nodes are identified by the node type name and a node instance name that is unique for a given node type. The node type definition is advantageously enabled to be business-driven. A prior art entity relationship diagram describes the structure of the catalog by defining the node types, the node attributes and the possible relationships, and optionally access control information. The catalog structure is stored in the database in a separate set of structure tables. This set of tables is used by the inventive, generic catalog maintenance tool to customize itself by validating the user input using the structure definition stored in said structure tables.

12 Claims, 8 Drawing Sheets

METHOD OF STRUCTURING A CATALOG

FIELD OF THE INVENTION

The present invention relates to electronic management of data. In particular it relates to a method and system for managing data, which can be represented in a directed graph according to an entity relationship model.

BACKGROUND OF THE INVENTION

Although the present invention has a quite broad range of applications, it will be set in contrast to a specific prior art, i.e., a maintenance or management tool for a product catalog which is offered via the Internet. An example is a merchant's commerce system like the "WebSphere CommerceSuite", provided by IBM. Nevertheless, the invention is applicable to any other structured agglomeration of data which can be represented in a directed graph and can be described with an entity relationship model. Further examples are business models which are also mapped into such representation or other data maintained within a relational database structure.

Thus, the sample data in the above sense is the data related to the products, as e.g., product names, generic names for certain product groups, or generic names for meta groups comprising several of said product groups, as well as product attributes and the usual overhead data, as e.g., a catalog contents list and further supplementary information, like text, image or multimedia information, relating to individual products, product groups, or articles. Articles are herein understood as a buyable product, i.e. a product with all attributes necessary to place an order specified.

The example of a catalog is chosen as the products presented in the catalog can be very numerous and sorted in an ambiguous manner within the graph. The graph may thus include meshes.

First, Catalog Maintenance will be discussed next below:

When a catalog is offered via the Internet, i.e. a web catalog, instead of a book which is usually issued once or twice per year, the problem of maintaining the product asset up-to-date is even more visible because any maintenance work should be done quite quickly and free of errors, otherwise the catalog cannot be visited online by the clients, or in case of errors, the clients could be confused.

A (web) catalog contains information about the articles to sell, like a language dependent name, some description, a number for the Enterprise Resource Planning (ERP) system of the merchant, and it often contains the price for the article. There is also the option to store different attributes to an article, like the color or size information, for example. The types of these attributes might be different for different groups of articles. For some articles like clothes the size and color are relevant while for others, maybe the weight is the relevant attribute.

The merchant cannot just present the customer a flat list of articles to buy, because usually the list would be too long and the customer would not be able to find the desired goods. Therefore the articles are organized into groups. All articles in a group will have a common generic type (e.g., poem books has the generic type 'books', or handcraft tools that of 'tools', or women's trousers that of 'trousers' or clothes, if structured like that . . . ). One article or product can be in more than one group. The groups itself might be grouped again until the number of items is small enough to be presented to the customer. There is also the option to store different attributes to a group.

Now there are two general problems for a merchant offering such catalog:
1. The articles thereof have to be maintained. This task includes maintenance of the type of article and of the attributes for each article. Also the grouping of articles and the groups have to be maintained. This includes the attributes for the groups, as well as the relationship among groups and between groups and articles.
2. The relation between articles (or groups) and possibly supplementary information in an associated content- or document management system needs to be defined and maintained.

It can easily be seen, that a program application, i.e., a management or maintenance tool for maintaining the catalog information is needed. Such tool must provide the functionality, for example to add, edit, or remove a catalog node, product or article.

In prior art, such tool exists. It is usually strongly customized because it depends on the specific data model of the respective particular catalog actually in question.

In a very basic approach there would be for example one table for trousers and another for shirts and so on, i.e. the database structure to store the catalog reflects the group relations. This prohibits the use of standard catalog maintenance software, as the specific catalog structure must be programmed into the catalog maintenance tool. The reason is that not all merchants do offer the same products and articles.

In a more common approach all articles are stored in one set of tables (e.g. one for the article, another for the attributes etc) and the groups in a different set of tables. Here, however, it is difficult for the maintainer to find the right parents or children when creating relationships: The maintainer has to select the nodes from a large list. This is a large source for generating maintenance errors.

Currently, the intelligence to support a catalog maintainer in this task is program logic built-in directly into the maintenance tool in use. This means the intelligence (rules) to handle each type of catalog node is directly programmed into the maintenance tool. For example there are custom queries programmed into the tool to find the possible children for a selected node type. Also the set of attributes for different types of articles is programmed into the maintenance tool such that the correct GUI can be presented to the catalog maintaining person. This limits the use of standard 'off the shelf' catalog maintaining (management) software.

On the other hand, there exist also generic catalog maintenance tools. Those tools, however, rely on the intelligence of the catalog maintainer, as the tool itself has no knowledge about the type of the content. This user has to make sure that all necessary fields are filled-in and no wrong relationships are defined. This restricts the possible number of users, because a maintaining person must have excellent knowledge on the products offered within the catalog. Further, due to this fact, this kind of generic tool is only usefully applicable for small catalogs.

Thus, catalog maintenance is difficult, complicated and expansive for a merchant.

Next, the relationship between catalog maintenance and Content- and Document Management will be discussed with respect to prior art disadvantages:

It is not always feasible to store all information about an article in the catalog itself. Often, the merchant has some content- or document management system, in which he manages documents (e.g. office documents or PDF files) that hold relevant information about the article for the customer. The merchant often chooses to manage those documents in such a management system because he wants to use the workflow and release management of those tools.

The relationship between an article to its supplementary information is realized in prior art according to basically two different approaches. The first is by exchanging internal keys of one system (catalog or document management system) into the other. That means storing the internal identifier of a document in the document management system as an attribute of the article in the catalog and vice versa. This prior art approach has the disadvantage that the internal identifiers are not permanently the same, i.e., stable. For example, deleting a document or an article and recreating will most likely yield a different internal identifier for the newly created article, because they are generally automatically created. Thus, the other system must be updated also. This is a significant disadvantage.

The second approach in use involves meta-information about the structure of the catalog and the way the documents are maintained in the document management system. That is for example, when the documents in the document management system are organized in the same (file-)structure as the articles are stored in the catalog, or when the application 'knows' where to look for information about this article in the document management system, due to a 'hard-wired' link. This, again, limits the use of standard software or restricts the structure in one of the two systems (catalog or management system).

A further problem of today's technology, in particular when applied via the Internet, is that the internal identifier is used in the URL that is given to the customer. The customer might run into problems that the URL is no longer valid, if he selects to put a bookmark on the page pointed to by the URL, and the database had to be reloaded. This also happens, if someone wants to put a link to the article on his own web page.

SUMMARY

It is thus an objective of the present invention to provide a method and system which simplifies the use of standard (off-the-shelf) software for data management of business data stored according to a graph structure, and in particular for catalog maintenance.

This objective of the invention is achieved by the features stated in enclosed independent claims. Further advantageous arrangements and embodiments of the invention are set forth in the respective subclaims. Reference should now be made to the appended claims.

According to the broadest aspect of the invention, a method for managing business data is provided, e.g. in form of a respective maintenance program tool, said business data being able to be represented as a plurality of objects, and to be structured as a plurality of different node types, i.e., to be understood as nodes in the graph-theoretic sense, of a directed graph, said data being advantageously related to each other according to an entity-relationship model, in which method advantageously a set of tables is provided for managing the data. Said method is characterized by the steps of:

a) processing user input information comprising meta-information defining a first specification of the graph structure, said meta-information comprising general information about:
  node type semantic meaning,
  the relationship between said node types, and
  attributes of each node type,
  prescribed by the model, b) at runtime of the program, presenting (715, 720, 725, 730, 735) a user-interface for entering a second graph specification (505,508) reflecting a concrete instance of the first specification dedicated for managing the business data according to the requirements determined by said first specification, and c) checking (740,742) user input for consistency with said first specification.

The above mentioned first graph specification shall be understood to comprise all detail information needed for defining the graph's topological and semantic frame within which the second specification is later defined as a particular instance of the first one.

Thus, in a simple example used just for explaining the basic inventive concept, the first specification may hold the following information:

The graph comprises a root node named A and having some semantic meaning, and two subordinated nodes B and C having both some specific semantic meaning, whereby B and C are not linked to each other. B has at most 3 attributes, one of them is required, and C has at most 4 attributes of which 2 are required and 2 are optional. Each of the nodes B and C is allowed to have at most 8 subordinated nodes.

The second graph specification comprises the following information: Node A is the root node having the enterprise name which uses the inventive method as a required attribute. It is linked to B and to C.

Node B has the semantic name "INDUSTRIES", one required attribute is present, e.g., "English-language" (used as a language definition). There are 6 different sub-nodes associated with B.

Node C has the semantic name "PRODUCTS", one required attribute is "ENGLISH_LANGUAGE", the other is "YYYYYYYY". An optional attribute is "ZZZZZZZ". C is linked to 5 different sub-nodes.

Preferred business data applied within the inventive concept is a catalog as discussed above, and more preferred a web catalog. Any reference to a catalog shall be understood as including other types of business data, as well. For sake of improved clarity, however, the maintenance of a catalog serves as the standard application for the inventive method.

The inventive technique described in this general approach offers a universal program which allows to dynamically configure the catalog maintenance tool for different types of catalog structures without reprogramming the tool.

By using this technique, a standard, off-the-shelf tool can be used to maintain any type of catalog, no matter what kind of products, which number of products, and in which media form, e.g., as a printed paper catalog, or a screen catalog, offered in whatever data carrier, or even via a network like the Internet. According to the invention, there is no need for programming for customization purposes, which reduces the effort of implementing the tool. The functionality provided, however, is the functionality of a fully customized maintenance tool. It should be understood, however, that said universal tool needs to be operated with an actual pool of real business data, i.e., the work to build the entity relationship model, and to fill some respective tables with true business data must be done before taking profit of the inventive approach.

In addition, the inventive method simplifies the relation between catalog content in different systems, by defining a unique node ID that can be used across different systems. By that, the time-sequential order in which a number of different prior art systems must be maintained, is not relevant anymore.

To apply a preferred concept of the invention comprises two basic steps, without focusing too many details now:

First, the catalog structure, i.e., a kind of entity-relationship diagram for the catalog is created: the catalog nodes (articles and groups) are assigned respective nodes, which can advantageously be business-defined node types (see later below for more details). Attributes are defined for each type, including whether they are required, or language dependent, as well as all necessary relationships between the node types.

In the second step the catalog structure is stored in a separate set of tables in the respective catalog database. Thus, in a preferred embodiment, there is a table where each row describes a node type, another table describes the attribute, a further table describes the relationships between node types, and further tables can be provided for storing even more meta-information usable for describing the business data model.

According to the present invention the catalog maintenance tool uses the meta-information, i.e., the structure stored in this set of structure tables to maintain the catalog. The structure is used to define GUI input elements, for example for attributes. The inventive concept is thus enabled to allow only such changes to the catalog such that the catalog is kept consistent with the structure as defined in those tables. For example attributes flagged as "required" are actually required when a maintenance user enters a new catalog node.

The advantage of this approach is that there is no need for the catalog maintenance tool to be custom-programmed anymore. A single, generic catalog maintenance tool can be used independently from the catalog structure present. This reduces the implementation effort for a catalog maintenance tool when adopting it to the custom catalog. In addition, it reduces the maintenance effort for the catalog maintenance tool itself, as it needs not be modified when the catalog structure is modified. Compared to other generic maintenance tools it restricts the possible changes to the catalog to those that are defined in the catalog structure tables. The maintenance tool can validate the user input and refuse to create invalid or inconsistent entries. This widens the set of possible users to much less technical but more business-oriented users. This means it provides the advantages of a custom-programmed maintenance tool at the low costs of a single, generic maintenance tool.

By giving the user the advantageous and often desired option of assigning a business-defined type to a catalog node, the internal workings of the catalog system are separated from the business requirements. This allows to define a unique node Identification (ID) that can be used not only in the catalog system but also in other systems (like content or document management systems). The main parts of the ID are proposed in here to be a) the node type name, and
b) a type-specific node instance identifier, that is also defined by the merchant.

The advantage is that no internal ID (like a database-generated sequence number) is used outside the system where it belongs to. Instead unique, easily understandable, and optionally business-related IDs are used. The IDs are constructed to be unique, which helps in identifying nodes from other systems. The IDs are system independent, which makes them resistant to changes to any system involved. This reduces any efforts when reloading a catalog after system crashes, for example.

When a further table is provided to address more than one type of business data, the inventive tool allows to be applied for more than one catalog, i.e., data pool, for example a catalog for books, and a separate catalog for food.

When a further table is provided for storing access control information for each node type, the data management may be performed by multiple staff, each staff member having a limited aces to limited nodes or node types. Such limitations can be varied gradually, and defined individually up to node level per staff member.

When the inventional method further comprises the step of preventing a new node type to be added into the second graph specification, if its structural definition is contradictory to the a structure definition already given within the first graph specification, then inconsistencies between objects and erroneous provision of attributes can be reliably avoided even when non-specialized stuff maintains the catalog.

Further, according to an independent aspect of the invention a use of a unique node identification across different data processing systems is disclosed. This advantageous feature is based on the fact that a node ID (name) is constructed in a hierarchical manner, reflecting the underlying graph, in which preferably the enterprise name may form the most significant part of the ID. More details are given further below.

BRIEF DESCRIPTION OF DRAWINGS

The present invention is illustrated by way of example and is not limited by the shape of the figures of the drawings in which.

DETAILED DESCRIPTION

Figure 1:
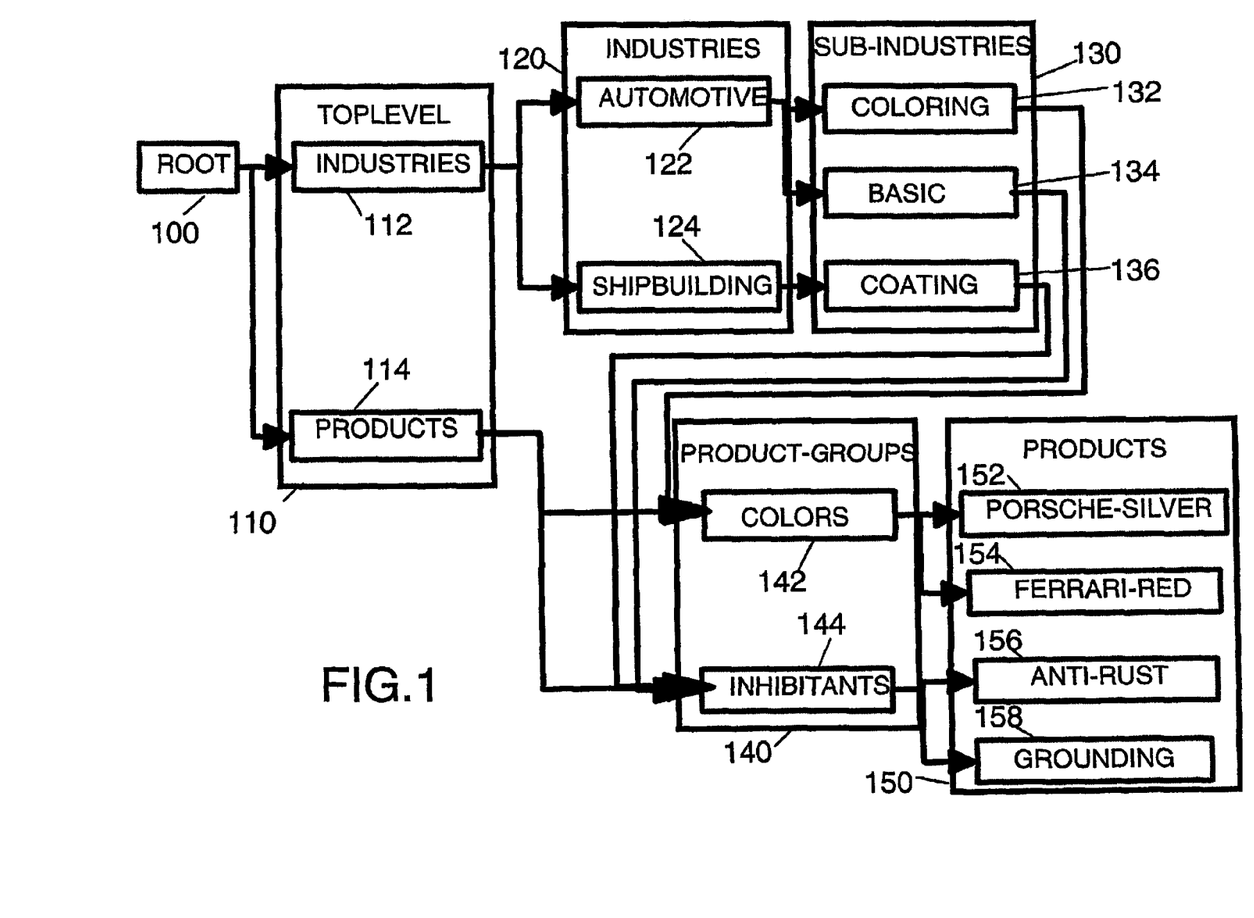
FIG. 1 is a schematic diagram illustrating a sample shopsite of a webcatalog in an overview representation, structured according to the present invention.

With general reference to the figures and with special reference now to FIG. 1 the sample shopsite comprises pages that are grouped together according to the invention in a number of different node types 100, 110, 120, 130, 140, 150, which in here are called structlevels. According to this preferred embodiment of the invention a node type is defined by the levelname, like "industries", 120 or "product_groups", 140, etc.

It should be noted that the names given in here for tables and nodes are tried to be selected such that their semantic significance can be easily interpreted from the name. Case sensitivity within the names is not done strictly throughout the description.

A node instance 112, 114, or 122, 124, or 132, 134, 136, or 142, 144, or 152 to 158 is then named—within a respective type—by a node (instance) name, like "Automotive" 122 or "Inhabitants" 144. Catalog nodes of the same type have the same attribute types. E.g. "Products" 150, e.g., the node instances "Porsche Silver" 152 or the other instances 154, 156, 158 thereof for example may have an attribute "colorcode" which contains a standard RAL color code.

Next, a preferred way to implement the present invention will be described in more detail. The implementation basically comprises a number of steps that are described next below and which uses the structure given in FIG. 1.

Figure 2:
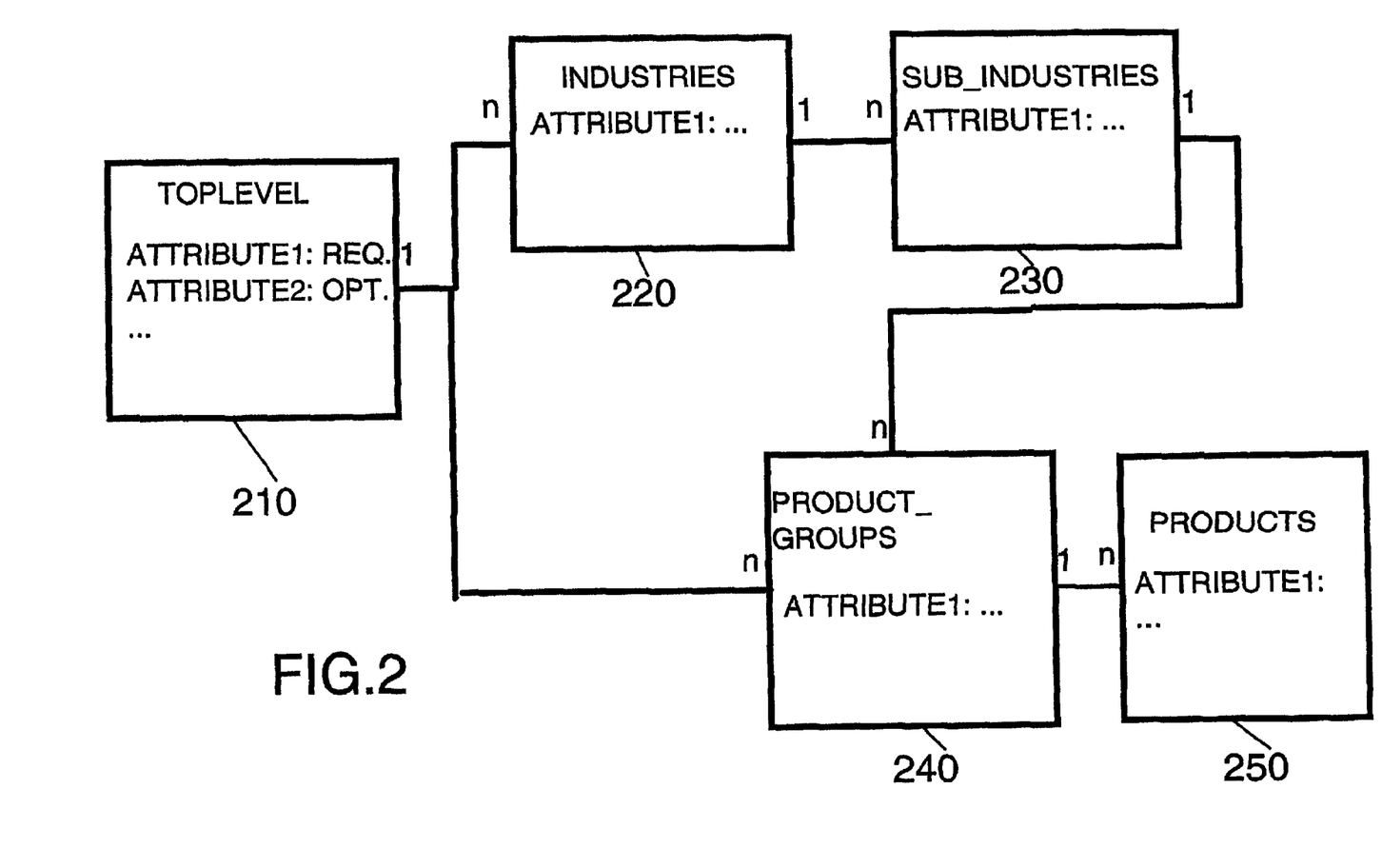
FIG. 2 is a schematic block diagram illustrating accordance to an entity-relationship model.

With additional reference to FIG. 2, in the first basic step an entity relationship diagram is created. According to the invention this is done with a very strict typification for the catalog.

A catalog is described as a set of nodes, as sketched out in FIG. 1. Said catalog nodes are grouped into node types 210 to 250 that are described by the entities in the diagram. For each catalog node type (i.e. entity) the set of attributes that are stored in the catalog are defined and stored separately. Attributes can be for example "required" or "optional" and "language dependent" or "not language dependent", "single value" or "multiple values", or others.

Further on the relationships between the node types are defined. If there is a link on the page for one node to the page for another node, this link must be reflected by the relationship between the two respective node types. A relationship can be defined as 1:n, n:1, 1:1 or n:m. The catalog nodes should be grouped such that nodes of the same type share the same set of attributes and relationships. Within each node type the node itself is identified by a node instance name that is unique within the node type.

The entity relationship diagram for the catalog as defined in here corresponds to the "structure" of the catalog as used in here.

The storing of the structure in the database according to a preferred embodiment of the invention will next be described:

Shortly summarized, a catalog is implemented with catalog nodes in one table and the relationships in another table.

Figure 5:
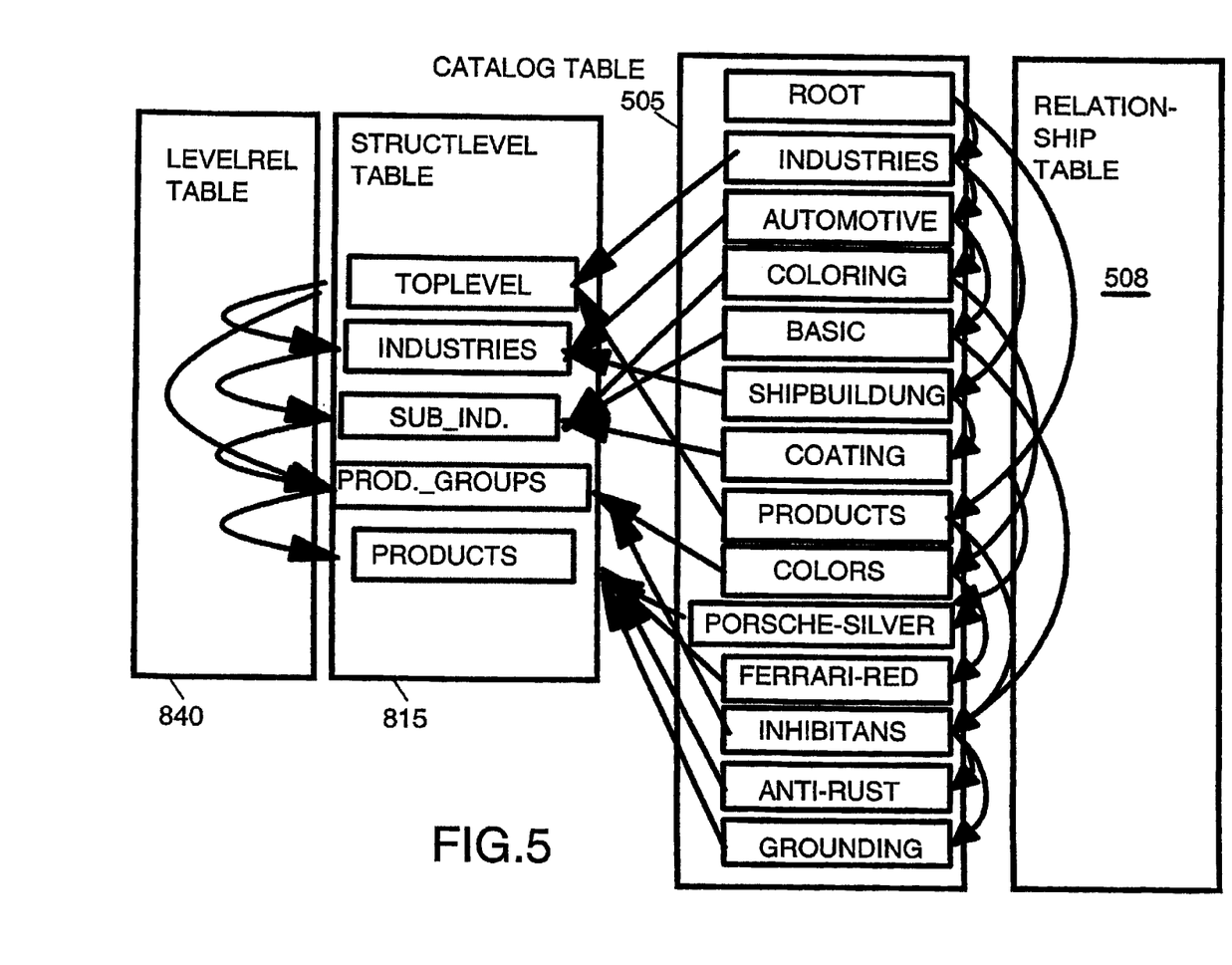
Figure 8:
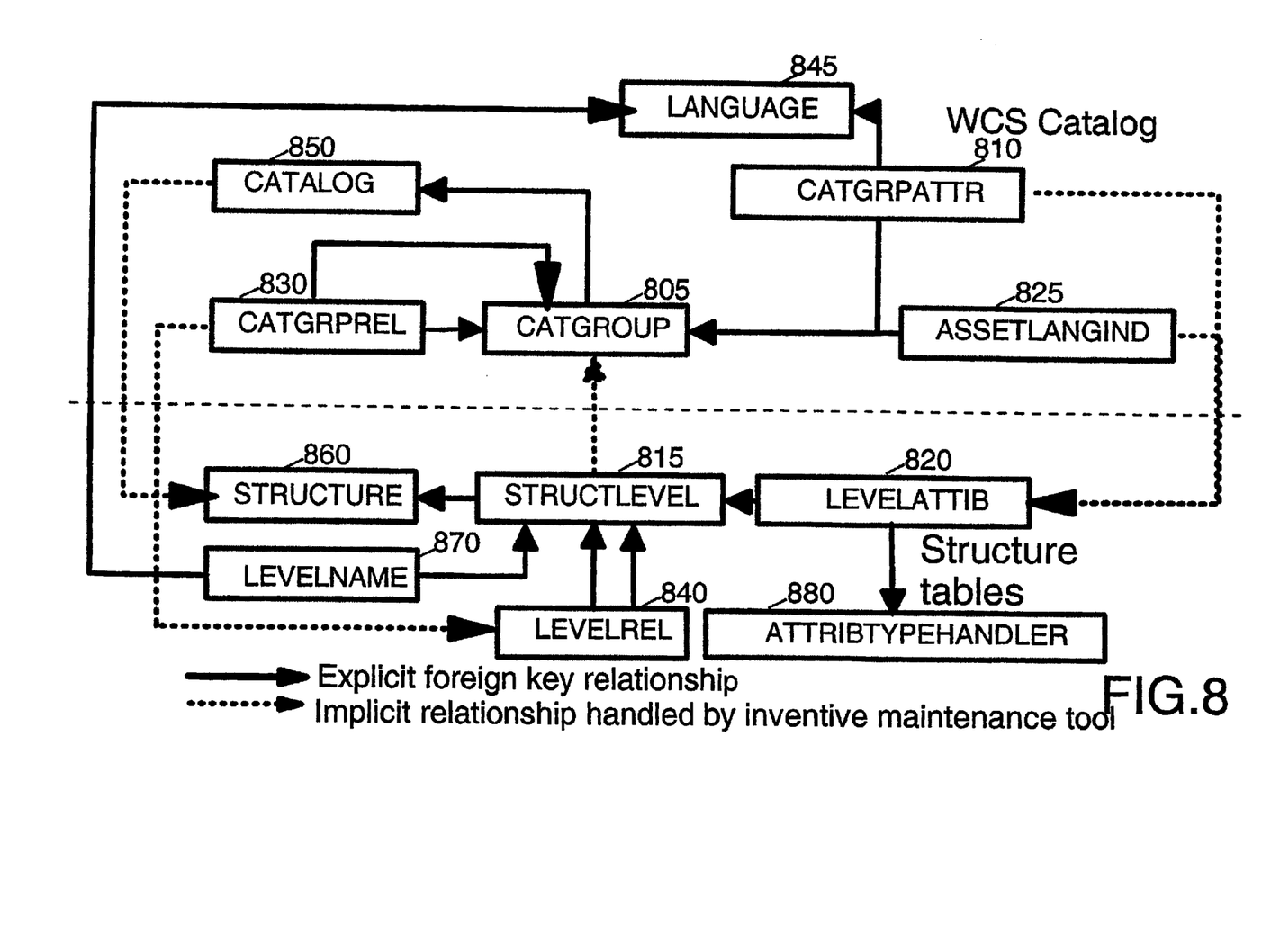
FIG. 8 is a schematic diagram illustrating an inventive Add-On to the data model.

According to the preferred embodiment another set of tables is added, which contents describe the structure of the catalog. This is depicted in FIG. 5 and FIG. 8, respectively in overview form. In particular, FIG. 5 depicts the implementation of the shopsite as stored in the tables described in FIG. 8.

With reference to FIG. 5 the catalog structure is stored in the catalog database in a separate set of tables, so-called "Catalog Structure Tables". The left hand side of FIG. 5 comprises tables 840 and 815, which are associated with the first graph specification mentioned above. The right hand tables 505 and 508 correspond to the second graph specification the input of which is checked for consistency with the first, when entered by the user. The structure and function of said tables are as follows:

A table 815, named STRUCTLEVELS, has one row for each node type or entity e.g., 'top level', 'industries', etc, see back to FIG. 1, reference signs 110 to 150. It holds the node type name, and a type that defines whether this is a toplevel and/or a leaf node. A foreign key reference points to the structure table which is not depicted.

A further LEVELREL table 840 defines the relationships between the node types. Each row defines a possible relationship. Two foreign key references point to the STRUCTLEVELS table, one for the parent type and one for the child node type. In addition it defines whether the relationship is 1:n, n:1, 1:1 or n:m.

In a CATALOG table 505, information about the nodes is stored. Its contents are the data that is actually to be displayed on the catalog page.

In a 'RELATIONSHIP' table 508, the relationships between node instances are stored.

A further, optional table, STRUCTURE, 860, see FIG. 8 (the table is not explicitly depicted in FIG. 5) has a row for each different catalog structure. This allows to handle more than one structure in a single system. CATGROUP table 805 corresponds to table 505, mentioned above.

A LEVELATTRIB table 820, see FIG. 8, contains, for each "structlevel", the list of respective attributes.

Each row of said table defines one attribute for a structlevel and contains the attribute name, and whether the attribute depends on the language and is required or not. A foreign key reference points to the STRUCTLEVELS table.

A LEVELNAME table 870 also points to said STRUCTLEVELS table 815 and has a relation to a LANGUAGE table 845. It contains localized names for the structlevel such that an inventive catalog maintenance tool can advantageously present localized names to the user. A similar table may be implemented for "structure" or "levelattrib" tables.

The Catalog Content Tables hold the actual catalog content. More details are shown in FIG. 8:

A CATGROUP table 805 contains the node instances. The implementation of this table depends on the actual commerce system in use. It should, however, contain a link to the STRUCTLEVELS table in order to define the type of each respective catalog node. Another link should point to the above mentioned catalog table. In addition it contains the node instance name that is unique within the node type. As the preferred embodiment is implemented as extension to an existing commerce system, the link to the STRUCTLEVELS table is depicted as implicit only in the diagram, but this should actually be an explicit foreign key relationship.

A CATGRPATTR table 810 contains the language dependent attribute values for the catalog nodes. Each row contains one value. A foreign key reference points to the catgroup table 805, a second one to the levelattrib table 820, mentioned earlier above. Another field holds the language. The primary key for this table is the catgroup reference plus the levelattrib reference plus the language.

An ASSETLANGIND table 825 contains the language independent attribute values. It is basically the same as the catgrpattr table 810, but without the language field.

A CATGRPREL table 830 holds the actual relationships between the catalog nodes. Each row defines one relationship. Two foreign key references point to the parent catgroup and the child catgroup entry. Another reference points to the levelrel table 840. The referenced catgroups must have references to the same structlevels rows as the references from the levelrel table 840.

It is also possible, to remove the foreign key relation from structlevel to structure and add a foreign key relation from levelrel to structure. Then it is possible, that catalog groups/articles are shared between different stores or that the relations can depend on other criteria (season, geographical region). One can even think on using mixtures having both foreign key relation.

It should be noted that table names are arbitrary. Other tables may supplement these tables, like for example the LEVELNAME table that holds the language dependent names of the structlevels, or CATGRPDESC that holds additional, language dependent descriptions for a catalog node. Also multiple-value attributes and enumerated attribute values can be defined. A ATTRIBTYPEHANDLER table 880 may contain information (like java class name) about how to handle a specific attribute type. User roles may be attached to structlevels rows and/or levelattrib rows such that a finely grained access control in a respective catalog maintenance tool can be implemented. Default values for attributes can be defined in the levelattrib table 820.

Figure 6:
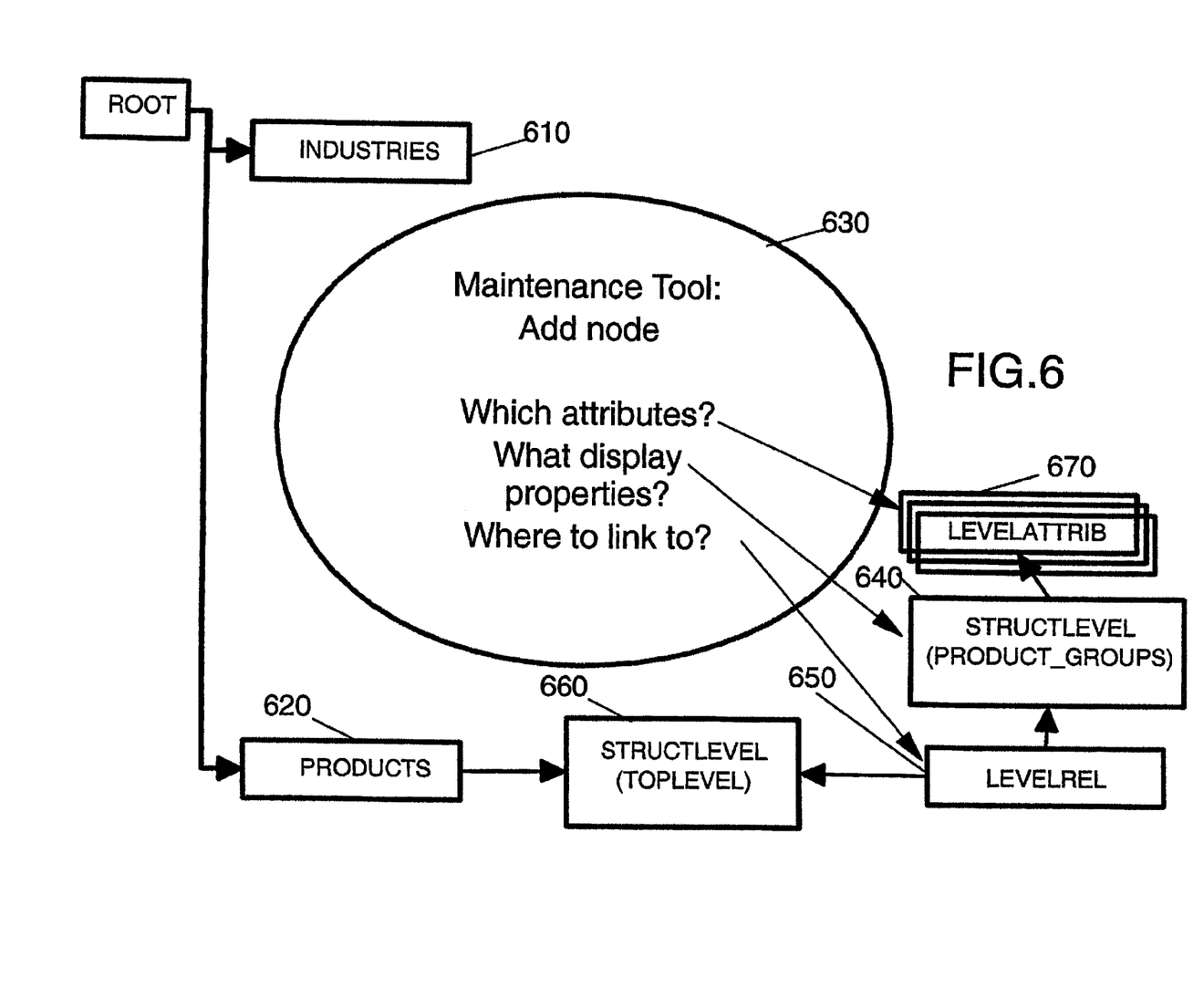
FIG. 6 is a schematic diagram illustrating the starting situation, in which an additional node shall be added to an existing data model according to the present invention.

A catalog maintenance tool can basically implement the focus of the inventive approach. It should advantageously be implemented such that, when a catalog node is created or modified, it reads the structure from the database and allows only such changes that are allowed by the structure definition. This will be described in more detail with reference to FIGS. 6 and 7:

FIG. 6 illustrates the starting situation in which an additional node shall be added to an existing data model according to the present invention. Under the node "Products" 620 a new node 630 shall be added.

Figure 7:
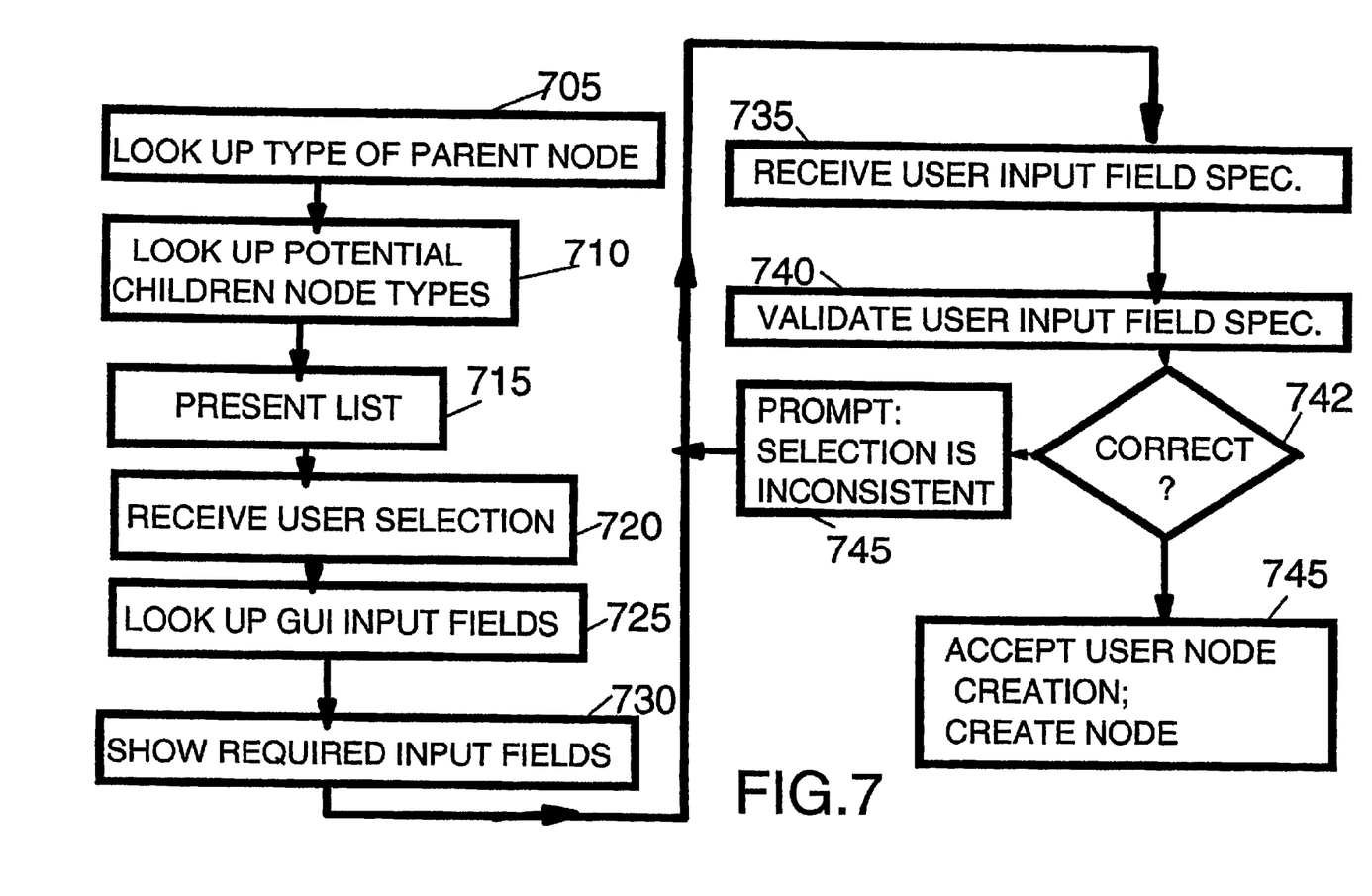
FIG. 7 is a schematic control flow diagram illustrating the basic steps in a preferred implementation of the inventive method when adding a node according to the situation of FIG. 6.

With additional reference to FIG. 7, when said new node 630 has to be added, the tool first looks up—step 705—the type of the current node that will become the parent of the new node, from the structlevels table. Then it sees, step 710, which node types can be linked to it as children in the levelrel table 650. The user can be presented a list of possible types as defined in the levelrel and structlevels table 660, step 715, and the user can then select, which type of node to add. A respective user selection is then received and processed by the inventive system, step 720. E.g., node type 'product_groups' is selected. In the levelattrib table 670 (that defines the attributes for a node of a given type) the maintenance tool reads, step 725, which input fields it has to present, of which type these fields are, and which of those fields must be filled, step 730. This definition is also used to validate, step 740, the user input from step 735. In case the input is correct, the user input is accepted as consistent with the data model, and the respective new node is created. Otherwise, see the NO branch from decision 742, the user is informed that such node creation would create inconsistencies, step 755, and control is fed back to step 735 for receiving an amended user input. An inconsistent node type adding is thus restricted.

Thus only such nodes can be created which do not cause inconsistencies to the existing data model.

Figure 3:
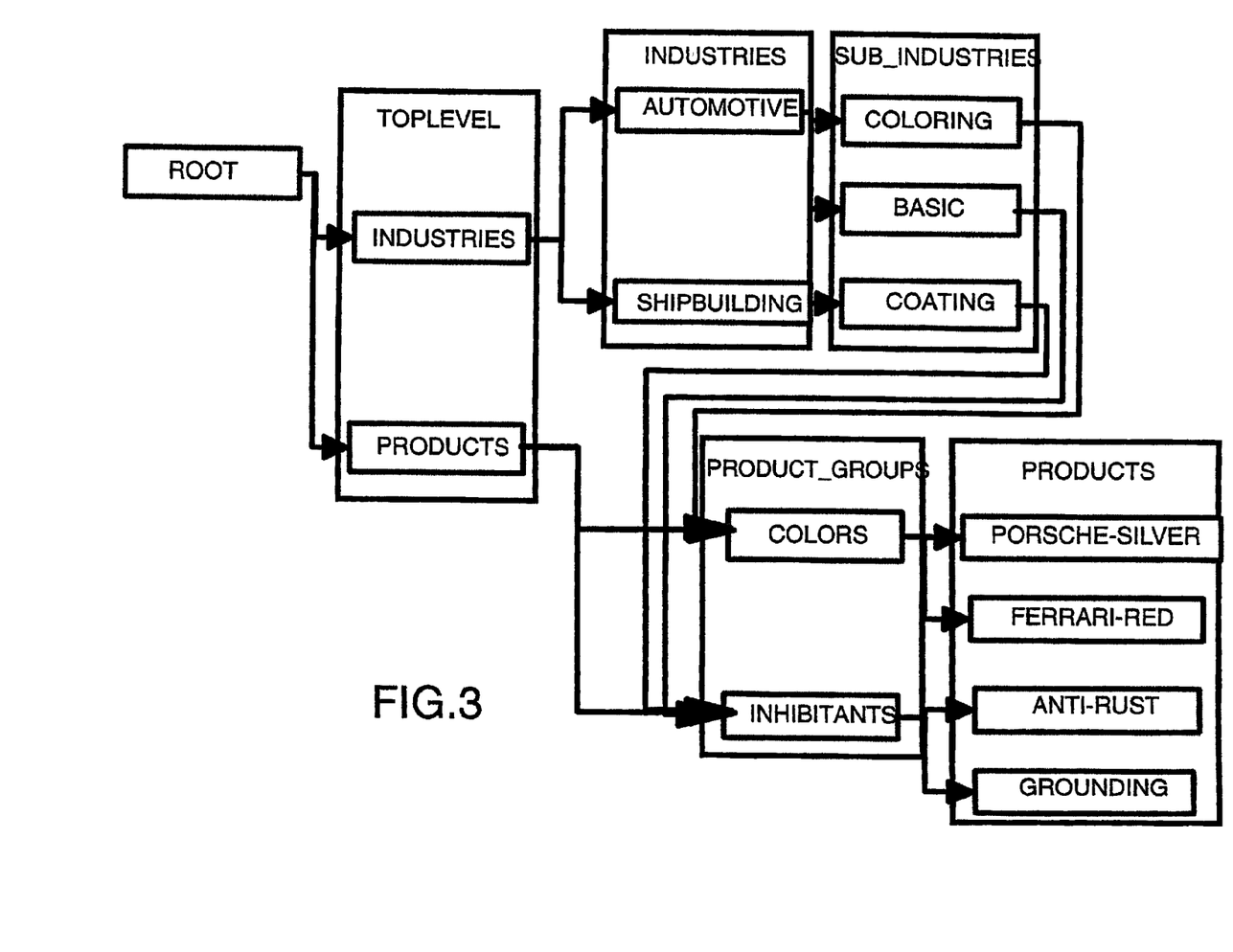
FIG. 3 is a schematic diagram illustrating the node identification according to the present invention.

Next, the particular significance of node ID naming provided by the invention will be discussed with reference to FIG. 3.

Using the structure defined above the present invention's basic approach is able to generate unique IDs, i.e. node IDs, that can be used across a plurality of different application systems. Preferred, the following is proposed:

A node ID is built in a hierarchical way. On the lowest level the node instance ID within a given node type must be unique. Then the node type name must be unique within the catalog. The catalog itself should be identified in another way which is not within the scope of the present patent application.

The node ID within the catalog is defined as a combination of the level name and the level instance. It can be used in other systems as well. Thus, for example, according to FIG. 3
toplevel/industries, or
Sub_industries/Coating, or
Product_groups/colors
Industries/shipbuildings, or
products/Ferrari-Red, etc.
can be generated as node instance ID.

Figure 4:
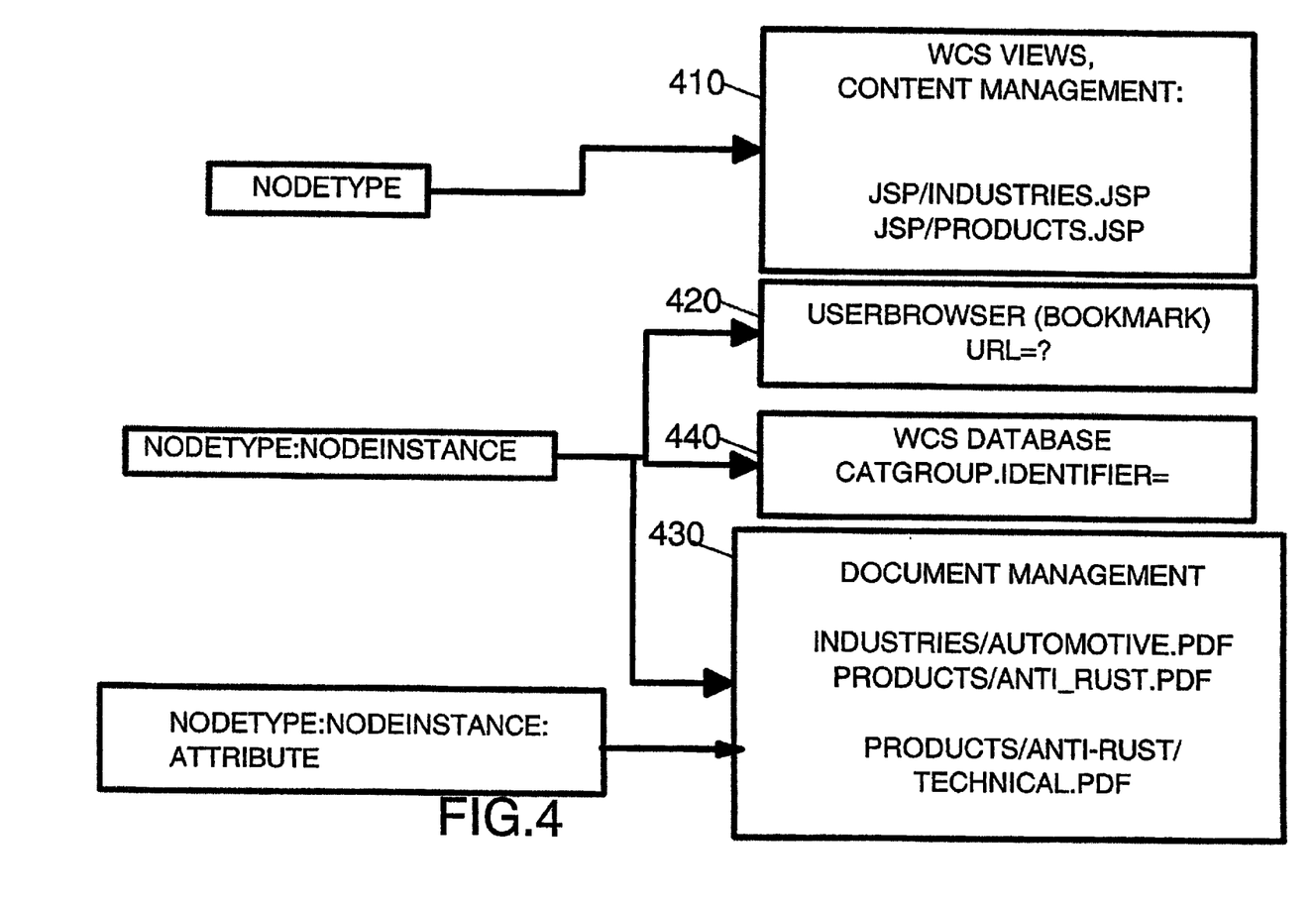
FIG. 4 is a schematic diagram illustrating a preferred node identification usage according to the present invention, FIG. 5 a schematic diagram illustrating the structure of the catalog and two additional structure tables according to the present invention.

Further, according to the invention, Unique Resource Names (URN) can be generated, for further broad and standardized usage:

The prior art RFC 2141 defines a URN as a global, unique identifier. The RFC defines only the syntax, not the content or structure of the URN. It can be constructed from the node ID and allows to comply not only with systems inside a given company, but also for example across different companies. This is depicted in FIG. 4.

The URN can be defined, e.g. as:

urn:<merchant>:catalog:<business>:<levelname>:<levelinstance> where

"<merchant>" is an identifier for the merchant, i.e., the company, that should be unique according to the URN specification.

"<business>" can be defined by business units within the merchants company. The actual node id is represented by the following fields:

"<levelname>" is the name of the node structure level (node type), and

"<levelinstance>" is the identifier within the level.

Examples are:

urn:Shopsite:catalog:chemicals:color:red123, or urn:Shopsite:catalog:chemicals:Products:Porsche_Silver In the node type definition node levels can be tagged to use special URNs e.g. if—as it is often done—"products" use specific-format material number as a levelinstance,:

urn: <merchant>: softwarevendorname:<software-vendorname-client>:<type>:<number>

For example:

urn:Shopsite:softwarevendorname:EU001:PRD:50076747

This is in fact only a redefinition of the catalog identifier when the level name is "PRD" and the "PRD" nodes use a specific softare vendor's number as an instance name.

The Node Id is unique and system independent. It can for example be used to retrieve additional information from Content/Document Management systems, where documents are stored under this Id.

Using the node ID it is possible to integrate the catalog easily with other systems, as depicted in FIG. 4: Examples are:

Content Management systems 410: The node ID contains display elements like JSPs for different node types. Key is the node type name "<levelname>"

html files in a file system or a database 440. The node ID can for example be stored in a directory named after the node id: "<locale>/<level name>/<level instance>". In a database the node ID can be stored in an identifier column.

A document management system 430 can store information related to catalog nodes addressed by the node Id "<level name>:<level instance>" and optionally an attribute name and/or a locale (or language).

In the user's browser 420 an URL ending with " . . . /<level name>/<level instance>" could point to the catalog node from the Internet.

From the foregoing detailed description the following should be appreciated by a person skilled in the art:

Any entity relationship model compliant data pool and particular a (web) catalog is structured by grouping catalog pages (nodes) into groups with similar properties like attributes and relationships. Catalog nodes are identified by the node type name and a node instance name that is unique for the node type. The node type definition is advantageously enabled to be business-driven.

A prior entity relationship diagram describes the structure of the catalog by defining the node types, the node attributes and the possible relationships, as well as access control information.

The catalog structure is stored in the database in a separate set of tables. This set of tables is used by the inventive, generic catalog maintenance tool to customize itself. The maintenance tool validates the user input using the structure definition stored in the structure tables.

The node type alone is used to identify display elements like JSPs or stylesheets that are needed to display a node of this type in the catalog. The full node ID consisting of node type name and instance name can be used to identify resources related to the catalog node across systems like document management systems.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of
the following
a) conversion to another language, code or notation;
b) reproduction in a different material form.

What is claimed is:

1. A computer system having means for performing the steps of a method according to:
   a) processing user input information comprising meta-information defining a first specification of the graph structure, said meta-information comprising general information about the admissibility of graph properties comprising admissible
   node type semantic meaning,
   relationship between said node types, and
   attributes of each node type prescribed by the model, and
   b) at runtime of the program, presenting a user-interface for entering a second graph specification reflecting a concrete instance said graph dedicated for managing the business data according to the requirements determined by said first specification, and
   c) checking user input for consistency with said first specification,
   wherein said data is related to each other according to an entire relationship model, and a set of database tables is provided for managing both graph specifications; and
   wherein a first table stores the plurality of node types with respective top level or leaf level or leaf level information, a second table stores the attributes for each node type, and a third table stores the relationship between said node types.

2. A computer program for execution in a data processing system comprising computer program code portions for performing respective steps of:
   a) processing user input information comprising meta-information defining a first specification of the graph structure, said meta-information comprising general information about the admissibility of graph properties comprising admissible
   node type semantic meaning,
   relationship between said node types, and
   attributes of each node type prescribed by the model, and
   b) at runtime of the program, presenting a user-interface for entering a second graph specification reflecting a concrete instance said graph dedicated for managing the business data according to the requirements determined by said first specification, and
   c) checking user input for consistency with said first specification,
   wherein said data is related to each other according to an entire relationship model, and a set of database tables is provided for managing both graph specifications; and
   wherein a first table stores the plurality of node types with respective top level or leaf level or leaf level information, a second table stores the attributes for each node type, and a third table stores the relationship between said node types.

3. A computer program product stored on a computer usable medium comprising computer readable program means for causing a computer to perform the method of:
   a) processing user input information comprising meta-information defining a first specification of the graph structure, said meta-information comprising general information about the admissibility of graph properties comprising admissible
   node type semantic meaning,
   relationship between said node types, and
   attributes of each node type prescribed by the model, and
   b) at runtime of the program, presenting a user-interface for entering a second graph specification reflecting a concrete instance said graph dedicated for managing the business data according to the requirements determined by said first specification, and
   c) checking user input for consistency with said first specification,
   wherein said data is related to each other according to an entire relationship model, and a set of database tables is provided for managing both graph specifications; and
   wherein a first table stores the plurality of node types with respective top level or leaf level or leaf level information, a second table stores the attributes for each node type, and a third table stores the relationship between said node types.

4. A computer program-implemented method for managing business data, the data being able to be represented as a plurality of objects, and to be structured as a plurality of different node types of a directed graph, characterized by the steps of:
   a) processing user input information comprising meta-information defining a first specification of the graph structure, said meta-information comprising general information about the admissibility of graph properties comprising admissible node type semantic meaning, relationship between said node types, and attributes of each node type prescribed by the model, and b) at runtime of the program, presenting a user-interface for entering a second graph specification reflecting a concrete instance said graph dedicated for managing the business data according to the requirements determined by said first specification, and c) checking user input for consistency with said first specification, wherein said data is related to each other according to an entire relationship model, and a set of database tables is provided for managing both graph specifications; and wherein a first table stores the plurality of node types with respective top level or leaf level or leaf level information, a second table stores the attributes for each node type, and a third table stores the relationship between said node types.

5. The method according to claim 4 in which a further table is provided for storing access control information for each node type.

6. The method according claim 4, in which node identification names are defined by a respective node type name and a respective node instance name which is unique for each respective node type.

7. The method according to claim 4, further comprising a further table to address more than one type of business data.

8. The method according to claim 4, in which the managed data represent a catalog comprising a plurality of products.

9. The method according to claim 4, in which the catalog is a catalog exposed via the Internet.

10. The method according to claim 4, further comprising the step of preventing a new node type to be added into the second graph specification, if its structural definition is contradictory to the first graph specification.

11. The method according to claim 4, in which hierarchically structured, unique node identification is used for forming a Unique Resource name (URN) on a respective node type level.

12. The method according to claim 4, in which a user of a unique node identification is across different data processing systems.

* * * * *